United States Patent
Tenny et al.

(10) Patent No.: US 8,340,664 B2
(45) Date of Patent: Dec. 25, 2012

(54) CELL RESELECTION IN A WIRELESS COMMUNICATION SYSTEM

(75) Inventors: Nathan Edward Tenny, Poway, CA (US); Masato Kitazoe, Hachiouji (JP); Francesco Grilli, La Jolla, CA (US)

(73) Assignee: Qualcomm Incorporated, San Diego, CA (US)

( * ) Notice: Subject to any disclaimer, the term of this patent is extended or adjusted under 35 U.S.C. 154(b) by 970 days.

(21) Appl. No.: 12/182,267

(22) Filed: Jul. 30, 2008

(65) Prior Publication Data

US 2009/0047954 A1 Feb. 19, 2009

Related U.S. Application Data

(60) Provisional application No. 60/953,970, filed on Aug. 3, 2007.

(51) Int. Cl.
*H04W 4/00* (2009.01)
*H04W 36/00* (2009.01)
*H04B 7/00* (2006.01)

(52) U.S. Cl. .................. 455/432.1; 455/435.3; 455/436; 455/525

(58) Field of Classification Search ....... 455/432.1–453, 455/525
See application file for complete search history.

(56) References Cited

U.S. PATENT DOCUMENTS

| | | | |
|---|---|---|---|
| 5,398,258 A | 3/1995 | Su et al. | |
| 5,729,531 A | 3/1998 | Raith et al. | |
| 6,016,428 A | 1/2000 | Diachina et al. | |
| 6,108,524 A | 8/2000 | Hershey et al. | |
| 6,304,756 B1 | 10/2001 | Hebeler et al. | |
| 6,625,132 B1 | 9/2003 | Boettger et al. | |
| 6,747,965 B1 | 6/2004 | Nara et al. | |
| 7,062,271 B2 | 6/2006 | Choi | |

(Continued)

FOREIGN PATENT DOCUMENTS

CN 1331891 A 1/2002

(Continued)

OTHER PUBLICATIONS

"3d Generation Partnership Project: Technical Specification Group Radio Access Network; User Equipment Procedures in Idle Mode and Procedures for Cell Reselection in Connected Mode," vol. V6.4.0, pp. 1-44, XP002385696, Dec. 2004.

(Continued)

*Primary Examiner* — Wesley Kim
(74) *Attorney, Agent, or Firm* — Charles Eggers; Kam T. Tam

(57) ABSTRACT

Techniques for performing cell reselection in a wireless communication system are described. A user equipment (UE) may initially camp on a first cell. While camped on the first cell, the UE may identify second and third cells deemed to be better than the first cell. The UE may move from the first cell to the second cell without performing cell reselection to camp on the second cell. After moving to the second cell, the UE may obtain at least one cell reselection parameter for the second and/or third cell and may update the rankings of the second and third cells based on the cell reselection parameter(s). The UE may then perform cell reselection from the first cell to the second or third cell based on the updated rankings, e.g., perform inter-frequency cell reselection from the first cell to the third cell without actually camping on the second cell.

30 Claims, 5 Drawing Sheets

U.S. PATENT DOCUMENTS

| | | | |
|---|---|---|---|
| 2002/0052201 A1 | 5/2002 | Wilhelmsson et al. | |
| 2003/0040311 A1* | 2/2003 | Choi | 455/434 |
| 2004/0043798 A1* | 3/2004 | Amerga et al. | 455/574 |
| 2004/0109431 A1* | 6/2004 | Abrahamson et al. | 370/342 |
| 2004/0190471 A1 | 9/2004 | Bender et al. | |
| 2004/0192287 A1 | 9/2004 | Namiki et al. | |
| 2005/0245260 A1* | 11/2005 | Nielsen et al. | 455/435.1 |
| 2006/0178153 A1 | 8/2006 | Tenny et al. | |
| 2006/0258386 A1* | 11/2006 | Jeong et al. | 455/525 |
| 2007/0004445 A1* | 1/2007 | Dorsey et al. | 455/525 |
| 2007/0223510 A1* | 9/2007 | Joo | 370/436 |

FOREIGN PATENT DOCUMENTS

| | | |
|---|---|---|
| DE | 19915584 | 10/1999 |
| EP | 1503608 | 2/2005 |
| JP | 60077259 | 5/1985 |
| JP | 05075530 | 3/1993 |
| JP | 05244075 | 9/1993 |
| JP | 10322760 | 12/1998 |
| JP | 2000175243 | 6/2000 |
| JP | 2004312721 A | 11/2004 |
| JP | 2008502253 A | 1/2008 |
| KR | 20060114947 A | 11/2006 |
| KR | 20070069930 A | 7/2007 |
| WO | WO0022853 A1 | 4/2000 |
| WO | WO0158054 A1 | 8/2001 |
| WO | WO0195504 A2 | 12/2001 |
| WO | WO2005122621 A1 | 12/2005 |

OTHER PUBLICATIONS

3GPP TS 25.302 V6.4.0 (Dec. 2004).

3rd Generation Partnership Project "UE Procedures in Idle Mode and Procedures for Cell Reselection in Connected Mode (Release 4)", Jun. 2002.

International Search Report—PCT/US2008/071985, International Search Authority—European Patent Office—Dec. 18, 2008.

Written Opinion—PCT/US2008/071985, International Search Authority—European Patent Office—Dec. 18, 2008.

3GPP TS 25.304 V4.0.0 (Mar. 2001) 3rd Generation Partnership Project: Technical Specification Group Radio Access Network; UE prodecures in Idle Mode and Procedures for Cell Reselection in Connected Mode (Release 4) Mar. 27, 2001.

European Search Report—EP11159506—Search Authority—The Hague—Apr. 8, 2011.

Taiwan Search Report—TW097129373—TIPO—Oct. 20, 2011.

* cited by examiner

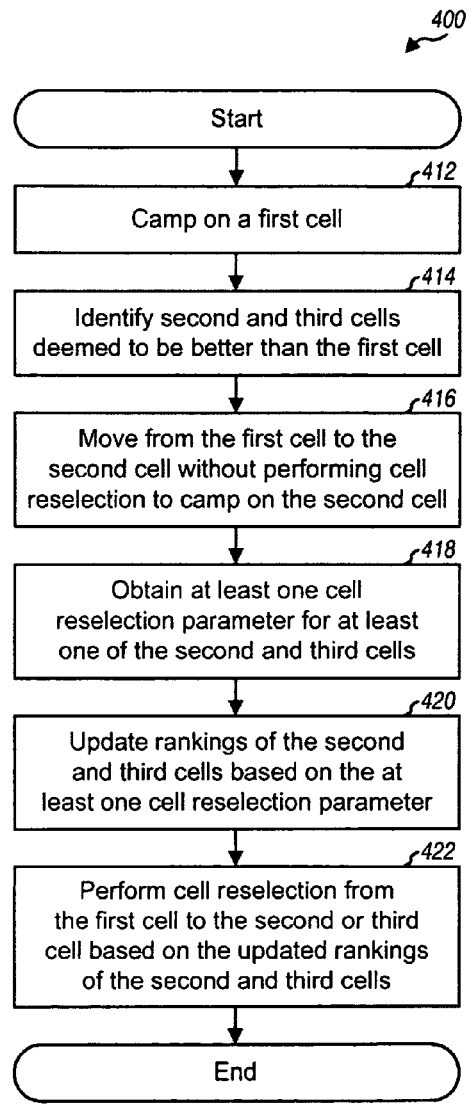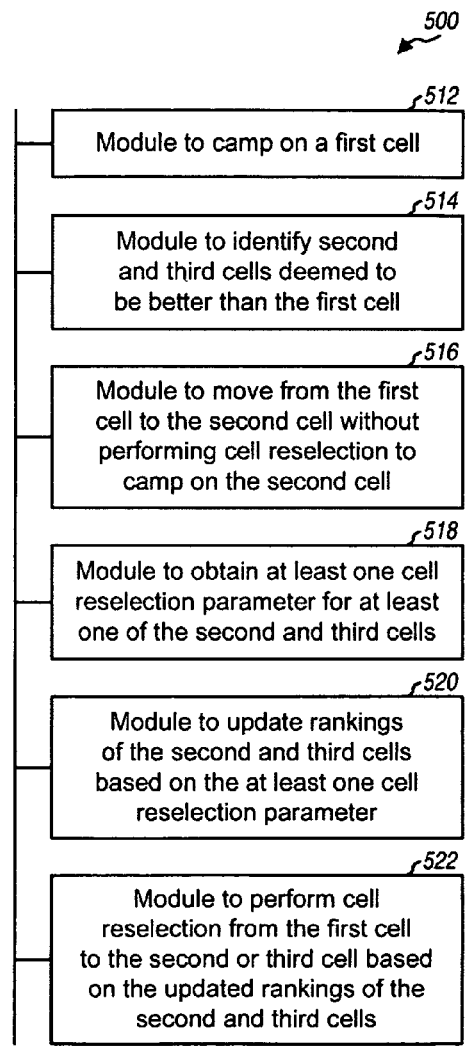
FIG. 4
FIG. 5

CELL RESELECTION IN A WIRELESS COMMUNICATION SYSTEM

The present application claims priority to provisional U.S. Application Ser. No. 60/953,970, entitled "CELL RESELECTION IN A WIRELESS COMMUNICATION SYSTEM," filed Aug. 3, 2007, assigned to the assignee hereof and incorporated herein by reference.

BACKGROUND

I. Field

The present disclosure relates generally to communication, and more specifically to techniques for performing cell reselection in a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include a number of cells, where the term "cell" can refer to the smallest coverage area of a Node B and/or a Node B subsystem serving this coverage area. A user equipment (UE) that is just powered on or has just lost coverage may search for suitable cells from which the UE can receive communication service. If a suitable cell is found, then the UE may perform registration with the system via the cell, if necessary. The UE may then "camp" on the cell if the UE is in an idle mode and not actively communicating with the cell. Camping is a process in which the UE monitors a cell for system information and paging information. The cell on which the UE is camped is referred to as the serving cell.

While camped on the serving cell, the UE may periodically search for better cells on the same frequency or another frequency. If a better cell is found, then the UE may select the better cell as a new serving cell via a process commonly referred to as cell reselection. Cell reselection may allow the UE to camp on the best possible cell even as channel conditions change, e.g., due to the UE moving to a new location. This may then allow the UE to reliably receive incoming paging messages and to initiate or receive calls.

The UE may exchange signaling messages in order to perform cell reselection to a better cell. It is desirable to efficiently perform cell reselection in order to reduce the number of signaling messages to exchange and possibly improve system performance.

SUMMARY

Techniques for performing cell reselection in a wireless communication system are described herein. A UE may initially camp on a first cell. While camped on the first cell, the UE may obtain signal measurements for each cell detected by the UE. The UE may compute a cell ranking criterion for each cell based on the signal measurements and one or more cell reselection parameters for that cell. The UE may rank the cells based on their cell ranking criteria and may identify second and third cells deemed to be better than the first cell. However, the UE may not have pertinent cell reselection parameters for the second and third cells and may not know whether the second cell is better than the third cell, or vice versa. The UE may make an initial determination that the second cell is better than the third cell based on default cell reselection parameters, e.g., a default Qoffset value that may be applicable for the frequency of the second and third cells.

In an aspect, the UE may move from the first cell to the second cell without performing cell reselection to camp on the second cell. After moving to the second cell, the UE may obtain at least one cell reselection parameter for the second and/or third cell. The UE may update the rankings of the second and third cells based on the at least one cell reselection parameter. The UE may then perform cell reselection from the first cell to the second or third cell based on the updated rankings. The UE may avoid transmission on the uplink until after updating the rankings in order to avoid causing interference on the uplink.

In one design, the UE may receive system information from the second cell and may obtain the at least one cell reselection parameter from the system information. The UE may receive a Qoffset value for the second cell from the second cell. The UE may also receive a Qoffset value for the third cell from the third cell or from a neighbor cell list transmitted by the second cell. The UE may update the rankings of the second and third cells based on the received Qoffset value for the second cell and either the received Qoffset value or a default Qoffset value for the third cell.

The UE may perform cell reselection in various manners. In one design, the UE may perform inter-frequency cell reselection from the first cell on a first frequency to the second or third cell on a second frequency. In another design, the UE may perform intra-frequency cell reselection from the first cell to the second or third cell on the same frequency as the first cell. For both designs, the UE may determine that the second cell is ranked higher than the third cell based on the updated rankings and may then perform cell reselection from the first cell to the second cell. Alternatively, the UE may determine that the third cell is ranked higher than the second cell based on the updated rankings and may then perform cell reselection from the first cell to the third cell, without performing cell reselection from the first cell to the second cell and without actually camping on the second cell.

Various aspects and features of the disclosure are described in further detail below.

BRIEF DESCRIPTION OF THE DRAWINGS

FIG. 4 shows a process for performing cell reselection.

FIG. 5 shows an apparatus for performing cell reselection.

DETAILED DESCRIPTION

The techniques described herein may be used for various wireless communication systems such as CDMA, TDMA, FDMA, OFDMA, SC-FDMA and other systems. The terms "system" and "network" are often used interchangeably. These wireless systems may support various radio technologies, which may also be referred to as radio access technologies (RATs), air interfaces, etc. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2). For clarity, certain aspects of the techniques are described below for LTE, and LTE terminology is used in much of the description below.

Figure 1:
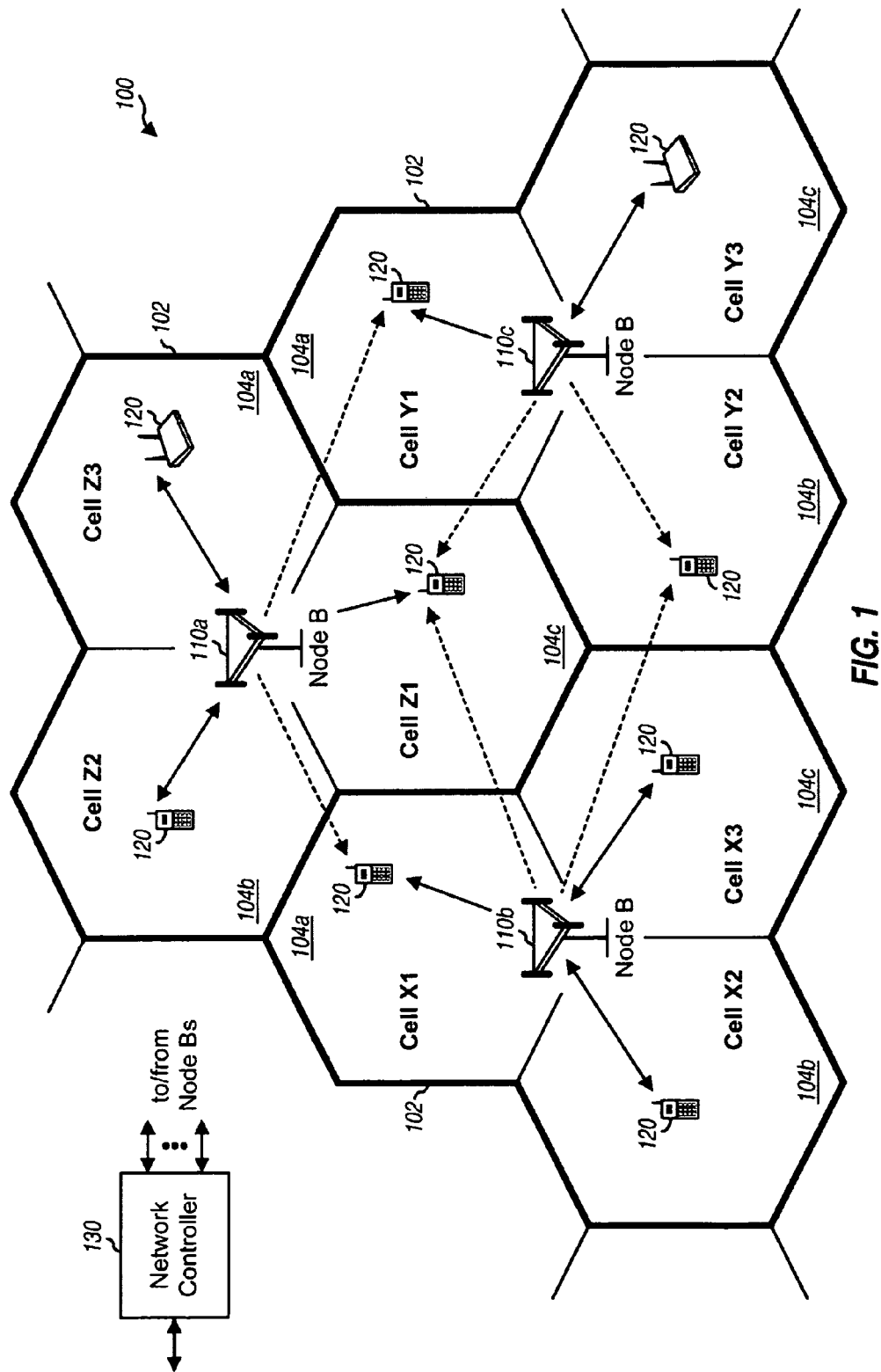
FIG. 1 shows a wireless communication system.

FIG. 1 shows a wireless communication system 100, which may be an LTE system. System 100 may include a number of Node Bs and other network entities. For simplicity, only three Node Bs 110a, 110b and 110c and one network controller 130 are shown in FIG. 1. A Node B may be a fixed station that communicates with the UEs and may also be referred to as an evolved Node B (eNB), a base station, an access point, etc. Each Node B 110 provides communication coverage for a particular geographic area 102. To improve system capacity, the overall coverage area of a Node B may be partitioned into multiple smaller areas, e.g., three smaller areas 104a, 104b and 104c. Each smaller area may be served by a respective Node B subsystem. In 3GPP, the term "cell" can refer to the smallest coverage area of a Node B and/or a Node B subsystem serving this coverage area. In 3GPP2, the term "sector" can refer to the smallest coverage area of a base station and/or a base station subsystem serving this coverage area. For clarity, 3GPP concept of cell is used in the description below.

In the example shown in FIG. 1, each Node B 110 has three cells that cover different geographic areas. For simplicity, FIG. 1 shows the cells not overlapping one another. In a practical deployment, adjacent cells typically overlap one another at the edges, which may allow a UE to receive communication coverage from one or more cells at any location as the UE moves about the system.

UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, etc. A UE may communicate with a Node B via the downlink and uplink. The downlink (or forward link) refers to the communication link from the Node B to the UE, and the uplink (or reverse link) refers to the communication link from the UE to the Node B. In FIG. 1, a solid line with double arrows indicates bi-directional communication between a Node B and a UE. A solid line with a single arrow indicates a UE camping on a cell. A dashed line with a single arrow indicates a UE receiving a downlink signal from a Node B, e.g., for making signal measurements.

A UE may perform cell selection upon power up or loss of coverage. For cell selection, the UE may perform a system search to find a suitable cell from which the UE can receive communication services. A suitable cell is a cell from which the UE can obtain normal services (as opposed to limited services such as emergency calls). A cell may be deemed as suitable if it meets certain criteria. If a suitable cell is found, then the UE may perform registration with the system via the cell, if necessary. The UE may then camp on the suitable cell if the UE is in an idle state and not actively communicating with the cell. The cell on which the UE is camped is referred to as the serving cell.

While camped on the serving cell, the UE may periodically check to see if there is a better cell that the UE can camp on and receive service. If such a cell exists, then the UE may select this cell as a new serving cell via a process commonly referred to as cell reselection. For cell reselection, the UE may exchange signaling messages with the current serving cell and/or the new serving cell to effectuate the change in serving cell for the UE.

While in the idle state, the location of the UE may be tracked so that the UE can be paged for incoming calls and/or for other reasons. The overall coverage area of the system may be partitioned into tracking areas, and each tracking area may include a group of one or more cells located near each other. Whenever the UE moves into a new tracking area, the UE may exchange signaling messages with the system in order to update its tracking area. If an incoming call is thereafter received for the UE, then a paging message may be sent to the UE by all cells in the current tracking area of the UE. By updating the tracking area of the UE as necessary, the UE can be reached by the system whenever needed.

The system may support operation on multiple frequencies in order to improve capacity and achieve other benefits. The multiple frequencies may also be referred to as frequency channels, carriers, frequency ranges, etc. Any number of cells may be deployed on each frequency. The cells on different frequencies may have overlapping or non-overlapping coverage areas.

The UE may perform (i) intra-frequency cell reselection to select another cell on the same frequency as that of the serving cell or (ii) inter-frequency cell reselection to select another cell on a different frequency. The frequency of the serving cell is referred to as the serving frequency. The UE may also perform cell selection to a new frequency, e.g., after release of a Radio Resource Control (RRC) connection where the system directs the UE to a different frequency.

For both intra-frequency and inter-frequency cell reselection, the UE may make measurements of received signal strength and/or received signal quality for the serving cell and neighbor cells based on a reference signal or pilot transmitted by each cell. Received signal strength may also be referred to as reference signal received power (RSRP), received signal strength indicator (RSSI), received signal code power (RSCP), received signal level, received strength, received pilot power, received pilot strength, etc. Received signal quality may also be referred to as energy-per-chip-to-total-noise ratio (Ec/No), signal-to-noise ratio (SNR), etc. For clarity, the use of received signal strength for cell reselection is described below.

The UE may process the signal measurements for the serving and neighbor cells to obtain a measurement value for each cell. The UE may then derive a cell ranking criterion for each cell based on the measurement value for that cell and cell reselection parameters. In one design, the ranking criteria for the serving and neighbor cells may be expressed as:

$$R_s = Q_{meas,s} + Qhyst_s, \text{ and} \qquad \text{Eq (1)}$$

$$R_n = Q_{meas,n} - Qoffset_{s,n} \qquad \text{Eq (2)}$$

where $R_s$ is a ranking criterion for serving cell s,
$R_n$ is a ranking criterion for neighbor cell n,
$Q_{meas,s}$ is a measurement value for serving cell s, $Q_{meas,n}$ is a measurement value for neighbor cell n,
$Qhyst_s$ is a hysteresis value for serving cell s, and
$Qoffset_{s,n}$ is an offset value between serving cell s and neighbor cell n.

The cell ranking criteria for cell reselection are described in 3GPP TS 36.304, entitled "Evolved Universal Terrestrial Radio Access (E-UTRA); User Equipment (UE) procedures in idle mode," which is publicly available. As shown in equations (1) and (2), various cell reselection parameters may be used to derive the cell ranking criteria. As shown in equation (2), one of the cell reselection parameters is a cell-specific parameter $Qoffset_{s,n}$ which may be defined for a specific serving cell s and a specific neighbor cell n. $Qoffset_{s,n}$ may be used to modify the measurement values for ranking cells during reselection. The ranking criteria for the serving and neighbor cells may also be defined based on different and/or additional parameters.

The UE may determine the ranking criterion for each cell that can be detected by the UE. The UE may ranks all cells based on their ranking criteria. The UE may then identify the cell with the best ranking criterion and may perform cell reselection to the best cell if this cell is not the current serving cell and if certain cell reselection criteria are met.

The cell reselection parameters for cells on the serving frequency may be signaled to the UE. The UE may then apply these cell reselection parameters to properly rank the cells on the serving frequency. However, the cell reselection parameters for cells on other frequencies and/or other RATs may not be signaled to the UE. In particular, the cell-specific parameter Qoffset may not be known to the UE in advance during inter-frequency or inter-RAT mobility. In such a case, the UE may use a default value for each neighbor cell with an unknown Qoffset. This default value may be a frequency-specific Qoffset value that may be applicable for all cells on a given frequency. The default value may also be a predetermined Qoffset value that may be applicable when the Qoffset value of a cell is not known. The default value may be provided by the current serving cell, or may be known a prior by the UE, or may be ascertained by the UE in some manner.

When the cell-specific parameters (e.g., the Qoffset) are unknown, the UE may perform inter-frequency cell reselection (or cell selection to a new frequency) and may find that the selected cell is actually not the best cell on the new frequency. This situation may be recoverable since the UE may be able to discover other cells on the new frequency and may then reselect to the best cell on the new frequency. However, this "double cell reselection" may cause extra signaling and generate extra load in the system, e.g., for tracking area updates and related burdens in interactions with the system.

Figure 2:
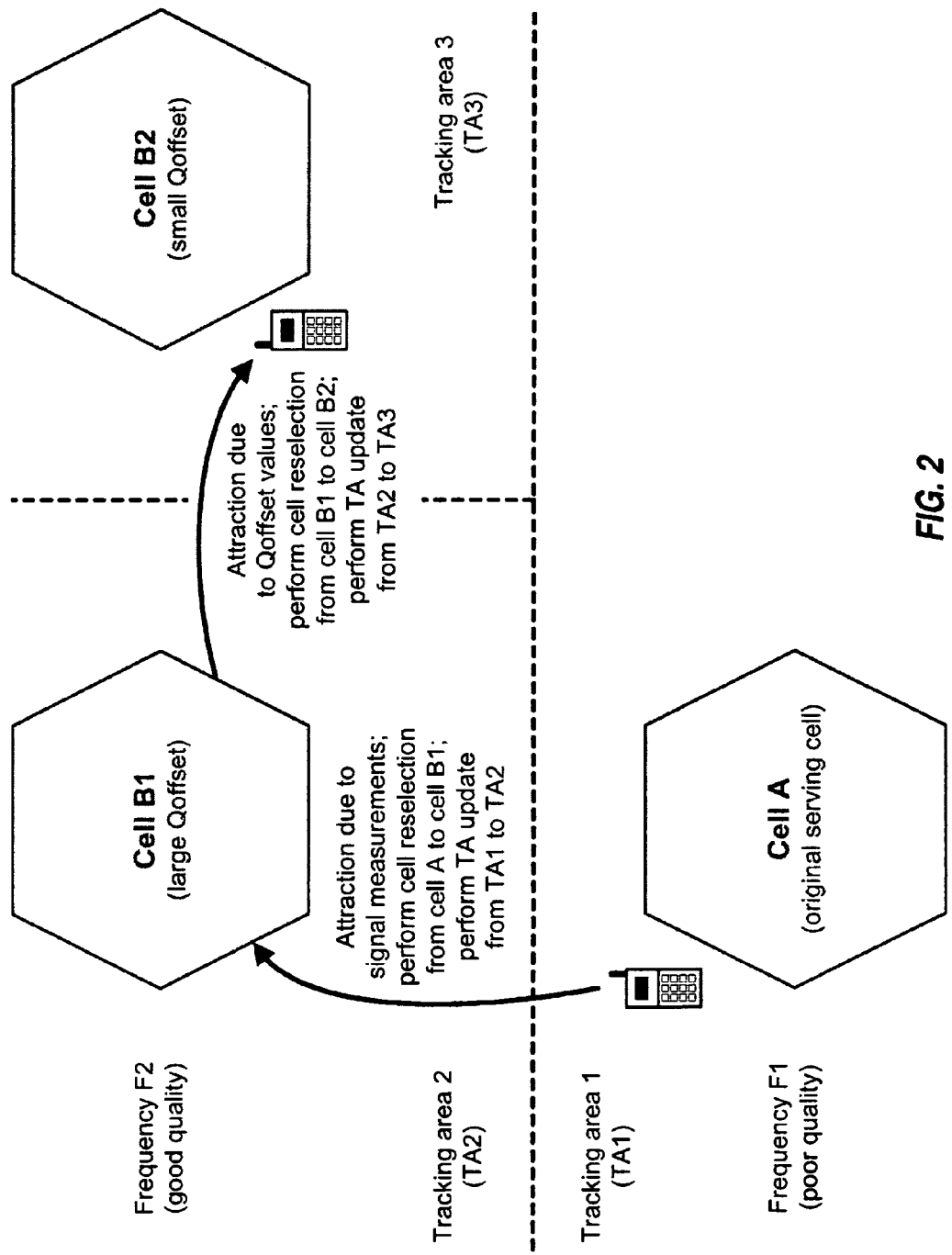
FIG. 2 shows double cell reselection during inter-frequency mobility.

FIG. 2 shows double cell reselection during inter-frequency mobility. In this example, the system supports operation on two frequencies F1 and F2. FIG. 2 shows three cells A, B1 and B2, which may be any three cells in FIG. 1 or some other cells in the system.

The UE may initially camp on cell A on frequency F1. The measurement value for cell A may be low, and the quality of frequency F1 may be poor. The quality of frequency F2 may be good or better than the quality of frequency F1. The UE may identify cells B1 and B2 as being better than the current serving cell A. The UE may obtain a better measurement value for cell B1 than cell B2. The UE may not know the cell-specific Qoffset values for cells B1 and B2 and may use the same default (e.g., frequency-specific) Qoffset value for both cells. Cell B1 may have the best ranking criterion among the three cells A, B1 and B2 based on the default Qoffset value.

The UE may perform inter-frequency cell reselection from cell A on frequency F1 to cell B1 on frequency F2. The UE may exchange signaling messages with the system via cell B1, typically in accordance with a cell reselection procedure, in order to camp on cell B1. The UE may then camp on cell B1, which may have a large Qoffset value. As shown in equation (2), the cell-ranking criterion is progressively worse for progressively larger Qoffset value because of the minus sign in the right hand side of equation (2). A large Qoffset value tends to make a cell less attractive whereas a small Qoffset value tends to make a cell more attractive. Once the UE has camped on cell B1, the UE may discover that cell B2 has a smaller Qoffset value than that of cell B1. The UE may determine that cell B2 is better than cell B1 and may then perform intra-frequency cell reselection from cell B1 to cell B2. The UE may thereafter camp on cell B2.

In the example shown in FIG. 2, cell A belongs in tracking area 1, cell B1 belongs in tracking area 2, and cell B2 belongs in tracking area 3. The UE may perform a tracking area update procedure whenever it moves into a new tracking area. In the example shown in FIG. 2, the UE may perform the tracking area update procedure once for the initial cell reselection to cell B1. The UE may again perform the tracking area update procedure for the subsequent cell reselection to cell B2.

The double cell reselection illustrated in FIG. 2 may be undesirable for several reasons. First, if the three cells A, B1 and B2 are in different tracking areas, then the UE may perform the tracking area update procedure twice. Second, the UE may generate interference on the uplink while camped on the "wrong" cell B1. This interference may be undesirable in a system with a frequency reuse of one (or reuse-1 system).

In an aspect, the UE may avoid double cell reselection by using a new cell (e.g., cell B1 in the example shown in FIG. 2) as a "virtual" serving cell. The new cell may be a virtual serving cell in the sense that the UE is not actually camped on the cell but nevertheless reads system information (e.g., system information blocks (SIBs)) from the cell as if the UE is camped on the cell. However, the UE does not receive paging information from the new cell and does not perform other camping functions for the new cell. The UE can virtually camp on the new cell without informing the cell and without exchanging signaling with the cell.

In one design, upon moving to the new cell, the UE may obtain the cell reselection parameters for the new cell and possibly neighbor cells. The UE may then determine how the cell reselection parameters affect the cell rankings at the UE. The UE may avoid performing cell reselection to camp on the new cell until the UE has applied the cell reselection parameters. If these parameters alter the UE's determination of the best cell, then the UE may perform cell reselection directly from the current serving cell to the best cell (e.g., from cell A to cell B2 in the example shown in FIG. 2), without camping on the new cell (e.g., cell B1).

Figure 3:
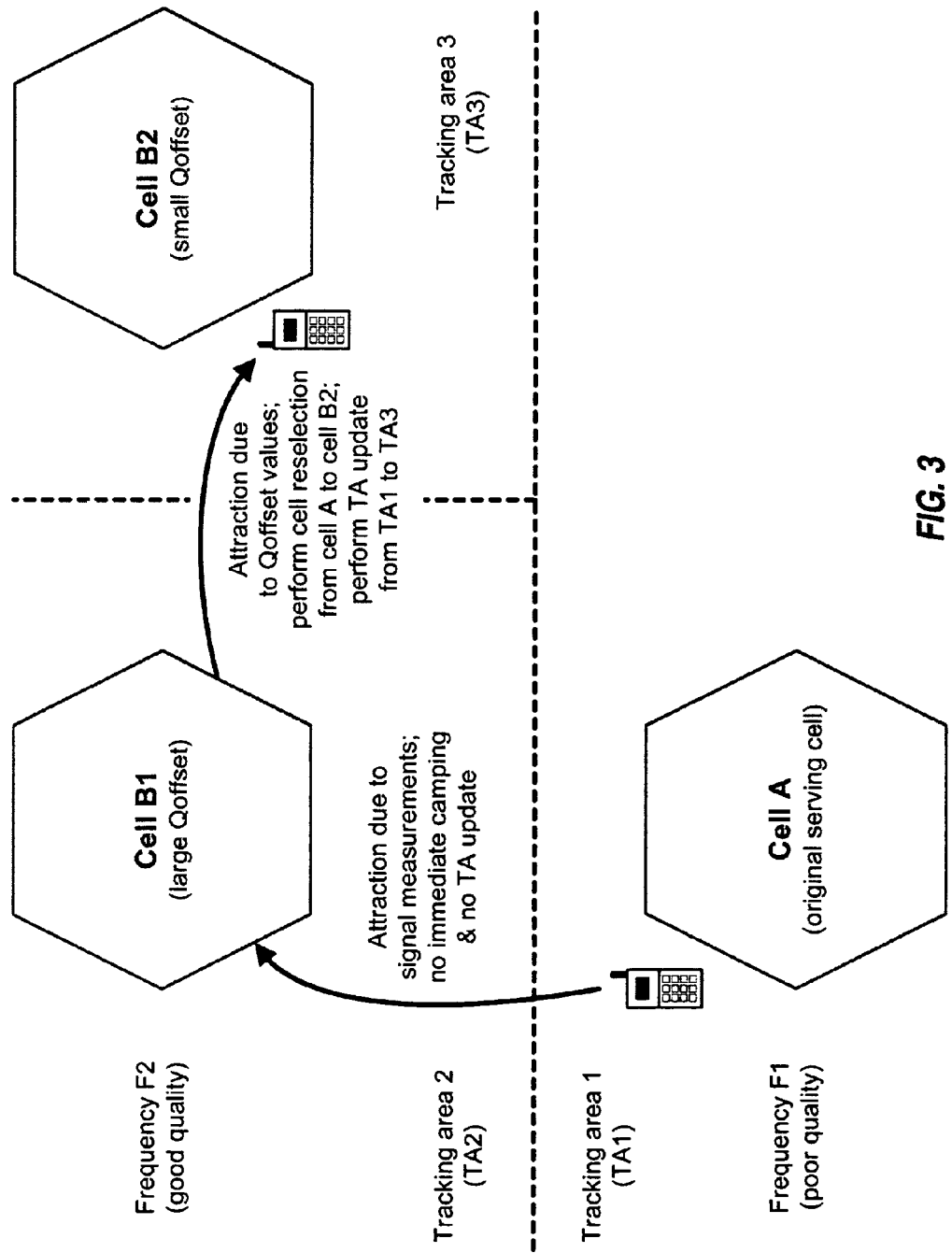
FIG. 3 shows cell reselection during inter-frequency mobility while avoiding double cell reselection.

FIG. 3 shows a design of cell reselection during inter-frequency mobility, which avoids double cell reselection. The UE may initially camp on cell A on frequency F1. The quality of frequency F1 may be poor, and the quality of frequency F2 may be good or better. The UE may obtain a better measurement value for cell B1 than cell B2. The UE may apply the same default Qoffset value for both cells B1 and B2 and may obtain the best ranking criterion for cell B1 among the three cells A, B1 and B2.

The UE may move to frequency F2 and may land on cell B1. However, the UE does not go through the cell reselection procedure to actually camp on cell B1. Instead, the UE may receive a downlink signal from cell B1 and obtain cell reselection parameters for cell B1 and/or cell B2. The UE may then update its cell rankings based on the cell reselection parameters and may review the updated cell rankings. In the example shown in FIG. 3, the UE may determine that cell B2 is ranked higher than cell B1, e.g., due to the Qoffset of cell B2 being smaller than the Qoffset of cell B1. The UE may then perform inter-frequency cell reselection from cell A on frequency F1 directly to cell B2 on frequency F2 and may then camp on cell B2. The UE may perform the tracking area update procedure since it has moved from tracking area 1 into tracking area 3. Although cell B1 belongs in tracking area 2, the UE never actually camped on cell B1 and may thus be seen as arriving directly from cell A in tracking area 1 to cell B2 in tracking area 3.

Although not shown in FIG. 3, if the UE determines that cell B1 is ranked higher than cell B2 after applying the cell reselection parameters, then the UE may perform inter-frequency cell reselection from cell A on frequency F1 to cell B1 on frequency F2 and may then camp on cell B1. The UE may also perform the tracking area update procedure since it has moved from tracking area 1 into tracking area 2.

Regardless of which cell on the new frequency is the better cell, the UE may avoid actually camping on the first cell that the UE lands on (e.g., cell B1 in the example shown in FIG. 3) for the new frequency until the UE has applied the cell reselection parameters. If the cell reselection parameters alter the UE's determination of the best cell, then the UE may perform cell reselection directly to the new best cell (e.g., cell B2 in the example shown in FIG. 3) without actually camping on the first cell on the new frequency.

As shown in FIG. 3, the use of cell B1 as a virtual serving cell may allow the UE to perform cell reselection only once (instead of twice as shown in FIG. 2) when the cell reselection parameters are not known by the UE initially. Furthermore, the UE may perform the tracking area update procedure only once (instead of twice as shown in FIG. 2). In addition, the UE may refrain from transmitting on the uplink while under cell B1 and may avoid causing interference on the uplink. The UE may transmit on the uplink after the UE has applied the cell reselection parameters and identified the best cell on the new frequency.

The UE may or may not be able to determine the Qoffset value for cell B2 while the UE is virtually camped on cell B1. This may depend on various factors such as the manner in which the cell reselection parameters are signaled by the system, the UE capabilities, etc. The UE may be able to determine the Qoffset value for cell B2 in several manners. In one design, the UE may receive the Qoffset value directly from cell B2. In another design, the UE may receive an intra-frequency neighbor cell list from cell B1, and this list may contain the Qoffset values for the cells in the list. In any case, the UE may be able to properly rank the cells if the UE has the Qoffset values for the neighbor cells.

If the UE does not know the Qoffset value for cell B2, then the cell rankings may be incorrect even after applying the Qoffset value for cell B1. For this reason, it may be desirable to have a mechanism for quick and efficient delivery of the Qoffset values for intra-frequency cells to the UE, e.g., via a neighbor cell list. However, even without such a mechanism, the techniques described herein may be able to avoid double cell reselection in certain cases. For example, the Qoffset value for cell B1 may be sufficiently large to change the cell rankings so that cell B2 is selected even before the Qoffset value for cell B2 is applied.

The techniques described herein may be used for intra-frequency cell reselection using a virtual serving cell, as described above. The techniques may also be used for intra-frequency cell reselection but should be applied in a manner to avoid ping ponging, e.g., between multiple cells with large Qoffset values. In certain cases (e.g., in a self-organizing network where the serving cell is not aware of the existence of the neighbor cells), the correct Qoffset value for an intra-frequency cell may not be known in advance. In these cases, the techniques described herein may be advantageously applied for intra-frequency cell reselection within a given frequency.

The UE may be in a connected state and may actively communicate with a cell. The system may indicate whether the UE should employ the virtual serving cell behavior when the UE transitions to the idle state. This indication may be provided, e.g., in an RRC message indicating release of a connection for the UE.

Using the techniques described herein, the UE may be able to perform inter-frequency cell reselection and possibly intra-frequency cell reselection while avoiding double cell reselection. The UE may be able to achieve this without having prior knowledge of cell reselection parameters for individual cells on a target frequency. The UE may obtain the cell reselection parameters after moving to a virtual serving cell on the target frequency. Since the double cell reselection problem may be due to the UE not knowing the cell reselection parameters of the target cell, by reading these parameters before camping, the UE may be able to avoid the root of the problem.

FIG. 4 shows a design of a process 400 for performing cell reselection in a wireless communication system. Process 400 may be performed by a UE (as described below) or by some other entity. The UE may initially camp on a first cell (block 412). While camped on the first cell, the UE may identify second and third cells deemed to be better than the first cell (block 414). The UE may move from the first cell to the second cell without performing cell reselection to camp on the second cell (block 416). After moving to the second cell, the UE may obtain at least one cell reselection parameter for at least one of the second and third cells (block 418). The UE may update rankings of the second and third cells based on the at least one cell reselection parameter (block 420). The UE may then perform cell reselection from the first cell to the second or third cell based on the updated rankings of the second and third cells (block 422). The UE may avoid transmission on the uplink until after updating the rankings of the second and third cells in block 420 in order to avoid causing interference on the uplink.

In one design of block 414, the UE may obtain signal measurements for the first, second and third cells. The UE may also obtain a default Offset value for the second and third cells. This default Offset value may be a Offset value that is applicable for the frequency of the second and third cells or may be a predetermined Offset value. The UE may determine the rankings of the first, second and third cells based on the signal measurements, the default Offset value, and possibly other parameters. For example, the UE may determine a cell ranking criterion for each cell as shown in equation (1) or (2) and may rank the cells based on their cell ranking criteria. The UE may identify the second and third cells as being better than the first cell based on the rankings of the first, second and third cells.

The UE may obtain the at least one cell reselection parameter in various manners in block 418. In one design, the UE may receive system information from the second cell and may obtain the at least one cell reselection parameter from the system information. The UE may receive a Qoffset value for the second cell from the second cell. The UE may receive a Qoffset value for the third cell directly from the third cell or from a neighbor cell list transmitted by the second cell. The UE may also receive the Qoffset values in other manners and/or may obtain other cell reselection parameters for the second and/or third cells.

The UE may update the rankings of the second and third cells in various manners in block 420. In one design, the UE may update the rankings of the second and third cells based on the Qoffset value for the second cell and a default Qoffset value for the third cell. In another design, the UE may update the rankings of the second and third cells based on the Qoffset values for the second and third cells. In yet another design, the UE may update the rankings of the second and third cells based on the Qoffset value for the third cell and a default Qoffset value for the second cell. For these designs, the UE may recomputed the cell ranking criterion for each cell based on the Qoffset value for that cell, e.g., as shown in equation (2). The UE may then determine the rankings of the cells based on the recomputed cell ranking criteria. The UE may also update the rankings of the second and third cells based on other cell reselection parameters and/or in other manners.

The UE may perform cell reselection in various manners in block 420. In one design, the UE may perform inter-frequency cell reselection from the first cell on a first frequency to the second or third cell on a second frequency. In another design, the UE may perform intra-frequency cell reselection from the first cell on a frequency to the second or third cell on the same frequency. For both designs, the UE may determine that the second cell is ranked higher than the third cell based on the updated rankings and may then perform cell reselection from the first cell to the second cell. Alternatively, the UE may determine that the third cell is ranked higher than the second cell based on the updated rankings and may then perform cell reselection from the first cell to the third cell, without performing cell reselection from the first cell to the second cell and without actually camping on the second cell.

FIG. 5 shows a design of an apparatus 500 for performing cell reselection in a wireless communication system. Apparatus 500 includes a module 512 to camp on a first cell, a module 514 to identify second and third cells deemed to be better than the first cell, a module 516 to move from the first cell to the second cell without performing cell reselection to camp on the second cell, a module 518 to obtain at least one cell reselection parameter for at least one of the second and third cells, a module 520 to update rankings of the second and third cells based on the at least one cell reselection parameter, and a module 522 to perform cell reselection from the first cell to the second or third cell based on the updated rankings of the second and third cells. The modules in FIG. 5 may comprise processors, electronics devices, hardware devices, electronics components, logical circuits, memories, etc., or any combination thereof.

Figure 6:
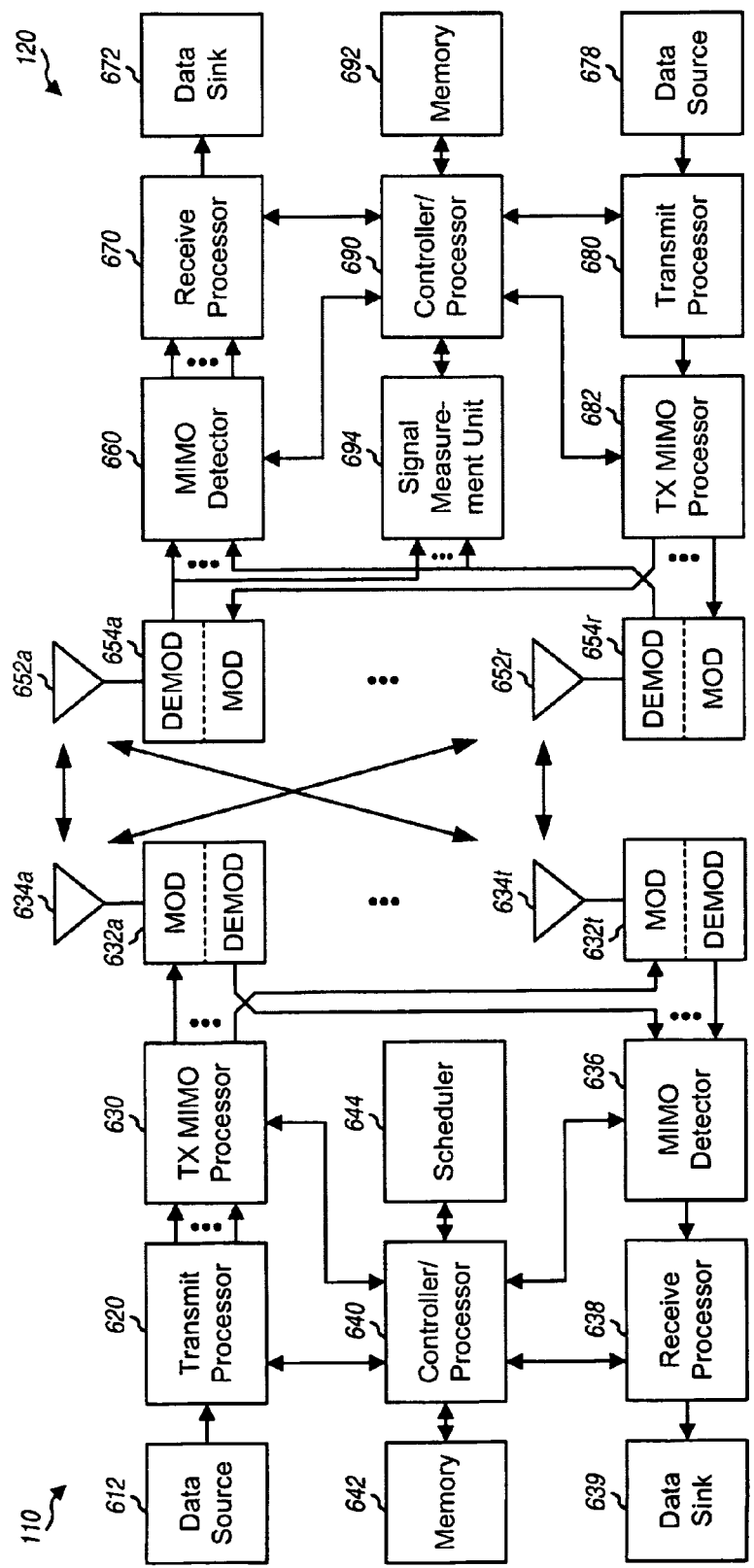
FIG. 6 shows a block diagram of a Node B and a UE.

FIG. 6 shows a block diagram of a design of a Node B 110 and a UE 120, which may be one of the Node Bs and one of the UEs in FIG. 1. In this design, Node B 110 is equipped with T antennas 634a through 634t, and UE 120 is equipped with R antennas 652a through 652r, where in general $T \geq 1$ and $R \geq 1$.

At Node B 110, a transmit processor 620 may receive traffic data for one or more UEs from a data source 612, process the traffic data for each UE based on one or more modulation and coding schemes selected for that UE, and provide data symbols for all UEs. Transmit processor 620 may also receive signaling from a controller/processor 640, process the signaling, and provide signaling symbols. Transmit processor 620 may also generate a reference signal or pilot, which may be used by the UEs to measure received signal strength and/or received signal quality. A transmit (TX) multiple-input multiple-output (MIMO) processor 630 may multiplex the data symbols, the signaling symbols, and pilot symbols. Processor 630 may perform spatial processing (e.g., precoding) on the multiplexed symbols, if applicable, and provide T output symbol streams to T modulators (MODs) 632a through 632t. Each modulator 632 may process a respective output symbol stream (e.g., for OFDM) to obtain an output sample stream. Each modulator 632 may further process (e.g., convert to analog, amplify, filter, and upconvert) the output sample stream to generate a downlink signal. T downlink signals from modulators 632a through 632t may be transmitted via T antennas 634a through 634t, respectively.

At UE 120, antennas 652a through 652r may receive the downlink signals from Node B 110 and provide received signals to demodulators (DEMODs) 654a through 654r, respectively. Each demodulator 654 may condition (e.g., filter, amplify, downconvert, and digitize) a respective received signal to obtain samples and may further process the samples (e.g., for OFDM) to obtain received symbols. A MIMO detector 660 may obtain received symbols from all R demodulators 654a through 654r, perform MIMO detection on the received symbols if applicable, and provide detected symbols. A receive processor 670 may process (e.g., demodulate, deinterleave, and decode) the detected symbols, provide decoded data for UE 120 to a data sink 672, and provide decoded signaling to a controller/processor 690. In general, the processing by MIMO detector 660 and receive processor 670 is complementary to the processing by TX MIMO processor 630 and transmit processor 620 at Node B 110.

On the uplink, at UE 120, traffic data from a data source 678 and signaling (e.g., for cell reselection) from controller/processor 690 may be processed by a transmit processor 680, precoded by a TX MIMO processor 682 if applicable, conditioned by modulators 654a through 654r, and transmitted to Node B 110. At Node B 110, the uplink signals from UE 120 may be received by antennas 634, conditioned by demodulators 632, processed by a MIMO detector 636 if applicable, and further processed by a receive processor 638 to obtain the traffic data and signaling transmitted by UE 120.

Controllers/processors 640 and 690 may direct the operation at Node B 110 and UE 120, respectively. Controller/processor 690 may perform and/or direct process 400 in FIG. 4 and/or other processes for the techniques described herein. Memories 642 and 692 may store data and program codes for Node B 110 and UE 120, respectively. A signal measurement unit 694 may measure received signal strength and/or received signal quality for each cell of interest and may provide signal measurements for the serving and neighbor cells to controller/processor 690. Controller/processor 690 may compute the cell ranking criteria for the serving and neighbor cells based on the signal measurements and cell reselection parameters, e.g., as shown in equations (1) and (2). Controller/processor 690 may perform cell reselection to the best cell determined based on the cell ranking criteria. A scheduler 644 may schedule UEs for transmission on the downlink and/or uplink and may provide assignments of resources for the scheduled UEs.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of performing cell reselection in a wireless communication system, comprising:
   camping on a first cell;
   identifying second and third cells deemed to be better than the first cell based on a default cell reselection parameter for the second and third cells;
   monitoring the second cell without performing cell reselection to camp on the second cell;
   obtaining at least one cell reselection parameter from at least one of the second and third cells;
   updating rankings of the second and third cells based on the at least one cell reselection parameter; and
   performing cell reselection from the first cell to the second or third cell based on the updated rankings of the second and third cells.

2. The method of claim 1, wherein the performing cell reselection comprises performing inter-frequency cell reselection from the first cell on a first frequency to the second or third cell on a second frequency different from the first frequency.

3. The method of claim 1, wherein the performing cell reselection comprises performing intra-frequency cell reselection from the first cell on a frequency to the second or third cell on the same frequency.

4. The method of claim 1, wherein the identifying the second and third cells deemed to be better than the first cell comprises
   obtaining signal measurements for the first, second and third cells,
   determining rankings of the first, second and third cells based on the signal measurements, and
   identifying the second and third cells as better than the first cell based on the rankings of the first, second and third cells.

5. The method of claim 4, wherein the first cell is on a first frequency and the second and third cells are on a second frequency, and wherein the determining the rankings of the first, second and third cells comprises
   obtaining a default Offset value for the second and third cells, the default Offset value being applicable for the second frequency, and
   determining the rankings of the first, second and third cells based further on the default Offset value.

6. The method of claim 1, wherein the obtaining the at least one cell reselection parameter comprises
   receiving system information from the second cell, and obtaining the at least one cell reselection parameter from the system information.

7. The method of claim 1, wherein the obtaining the at least one cell reselection parameter comprises receiving a Qoffset value for the second cell from the second cell, and wherein the updating the rankings of the second and third cells comprises updating the rankings of the second and third cells based on the received Qoffset value for the second cell and a default Qoffset value for the third cell.

8. The method of claim 1, wherein the obtaining the at least one cell reselection parameter comprises obtaining Qoffset values for the second and third cells, and wherein the updating the rankings of the second and third cells comprises updating the rankings of the second and third cells based on the Qoffset values for the second and third cells.

9. The method of claim 8, wherein the obtaining the Qoffset values for the second and third cells comprises
receiving the Qoffset value for the second cell from the second cell, and
receiving the Qoffset value for the third cell from the third cell or from a neighbor cell list transmitted by the second cell.

10. The method of claim 1, wherein the performing cell reselection comprises
determining that the second cell is ranked higher than the third cell based on the updated rankings of the second and third cells, and
performing cell reselection from the first cell to the second cell.

11. The method of claim 1, wherein the performing cell reselection comprises
determining that the third cell is ranked higher than the second cell based on the updated rankings of the second and third cells, and
performing cell reselection from the first cell to the third cell, without performing cell reselection from the first cell to the second cell.

12. The method of claim 1, further comprising:
avoiding transmission on uplink until after updating the rankings of the second and third cells based on the at least one cell reselection parameter.

13. An apparatus for wireless communication, comprising:
at least one processor configured to camp on a first cell, to identify second and third cells deemed to be better than the first cell based on a default cell reselection parameter for the second and third cells, to monitor the second cell without performing cell reselection to camp on the second cell, to obtain at least one cell reselection parameter from at least one of the second and third cells, to update rankings of the second and third cells based on the at least one cell reselection parameter, and to perform cell reselection from the first cell to the second or third cell based on the updated rankings of the second and third cells.

14. The apparatus of claim 13, wherein the at least one processor is configured to perform inter-frequency cell reselection from the first cell on a first frequency to the second or third cell on a second frequency different from the first frequency.

15. The apparatus of claim 13, wherein the at least one processor is configured to obtain signal measurements for the first, second and third cells, to determine rankings of the first, second and third cells based on the signal measurements, and to identify the second and third cells as better than the first cell based on the rankings of the first, second and third cells.

16. The apparatus of claim 13, wherein the at least one processor is configured to receive a Qoffset value for the second cell from the second cell, and to update the rankings of the second and third cells based on the received Qoffset value for the second cell and a default Qoffset value for the third cell.

17. The apparatus of claim 13, wherein the at least one processor is configured to obtain Qoffset values for the second and third cells, and to update the rankings of the second and third cells based on the Qoffset values for the second and third cells.

18. The apparatus of claim 13, wherein the at least one processor is configured to determine that the third cell is ranked higher than the second cell based on the updated rankings of the second and third cells, and to perform cell reselection from the first cell to the third cell, without performing cell reselection from the first cell to the second cell.

19. An apparatus for wireless communication, comprising:
means for camping on a first cell;
means for identifying second and third cells deemed to be better than the first cell based on a default cell reselection parameter for the second and third cells;
means for monitoring the second cell without performing cell reselection to camp on the second cell;
means for obtaining at least one cell reselection parameter from at least one of the second and third cells;
means for updating rankings of the second and third cells based on the at least one cell reselection parameter; and
means for performing cell reselection from the first cell to the second or third cell based on the updated rankings of the second and third cells.

20. The apparatus of claim 19, wherein the means for performing cell reselection comprises means for performing inter-frequency cell reselection from the first cell on a first frequency to the second or third cell on a second frequency different from the first frequency.

21. The apparatus of claim 19, wherein the means for identifying the second and third cells deemed to be better than the first cell comprises
means for obtaining signal measurements for the first, second and third cells,
means for determining rankings of the first, second and third cells based on the signal measurements, and
means for identifying the second and third cells as better than the first cell based on the rankings of the first, second and third cells.

22. The apparatus of claim 19, wherein the means for obtaining the at least one cell reselection parameter comprises means for receiving a Qoffset value for the second cell from the second cell, and wherein the means for updating the rankings of the second and third cells comprises means for updating the rankings of the second and third cells based on the received Qoffset value for the second cell and a default Qoffset value for the third cell.

23. The apparatus of claim 19, wherein the means for obtaining the at least one cell reselection parameter comprises means for obtaining Qoffset values for the second and third cells, and wherein the means for updating the rankings of the second and third cells comprises means for updating the rankings of the second and third cells based on the Qoffset values for the second and third cells.

24. The apparatus of claim 19, wherein the means for performing cell reselection comprises
means for determining that the third cell is ranked higher than the second cell based on the updated rankings of the second and third cells, and
means for performing cell reselection from the first cell to the third cell, without performing cell reselection from the first cell to the second cell.

25. A computer program product encoded on a non-transitory computer-readable medium, comprising:
- code for causing at least one computer to camp on a first cell,
- code for causing the at least one computer to identify second and third cells deemed to be better than the first cell based on a default cell reselection parameter for the second and third cells,
- code for causing the at least one computer to monitor the second cell without performing cell reselection to camp on the second cell,
- code for causing the at least one computer to obtain at least one cell reselection parameter from at least one of the second and third cells,
- code for causing the at least one computer to update rankings of the second and third cells based on the at least one cell reselection parameter, and
- code for causing the at least one computer to perform cell reselection from the first cell to the second or third cell based on the updated rankings of the second and third cells.

26. The computer program product of claim 25, the computer-readable medium further comprising:
- code for causing the at least one computer to perform inter-frequency cell reselection from the first cell on a first frequency to the second or third cell on a second frequency different from the first frequency.

27. The computer program product of claim 25, the computer-readable medium further comprising:
- code for causing the at least one computer to obtain signal measurements for the first, second and third cells,
- code for causing the at least one computer to determine rankings of the first, second and third cells based on the signal measurements, and
- code for causing the at least one computer to identify the second and third cells as better than the first cell based on the rankings of the first, second and third cells.

28. The computer program product of claim 25, the computer-readable medium further comprising:
- code for causing the at least one computer to receive a Qoffset value for the second cell from the second cell, and
- code for causing the at least one computer to update the rankings of the second and third cells based on the received Qoffset value for the second cell and a default Qoffset value for the third cell.

29. The computer program product of claim 25, the computer-readable medium further comprising:
- code for causing the at least one computer to obtain Qoffset values for the second and third cells, and
- code for causing the at least one computer to update the rankings of the second and third cells based on the Qoffset values for the second and third cells.

30. The computer program product of claim 25, the computer-readable medium further comprising:
- code for causing the at least one computer to determine that the third cell is ranked higher than the second cell based on the updated rankings of the second and third cells, and
- code for causing the at least one computer to perform cell reselection from the first cell to the third cell, without performing cell reselection from the first cell to the second cell.

* * * * *